United States Patent [19]
LaFleur

[11] 3,916,148
[45] Oct. 28, 1975

[54] HEAT SEALING HEAD FOR PLASTIC FILMS

[75] Inventor: Arthur E. LaFleur, Manistee, Mich.

[73] Assignee: Square Bag-It Corporation, Manistee, Mich.

[22] Filed: May 22, 1974

[21] Appl. No.: 472,297

[52] U.S. Cl. .............................. 219/243; 93/DIG. 1
[51] Int. Cl.² ....................... H05B 1/00; H05B 3/02
[58] Field of Search ......... 219/243, 543; 93/DIG. 1; 156/515

[56] References Cited
UNITED STATES PATENTS

| | | |
|---|---|---|
| 2,532,501 | 12/1950 | Johnson ........................... 219/243 X |
| 2,766,365 | 10/1956 | Winstead ......................... 219/243 X |
| 2,963,838 | 12/1960 | Harrison et al. ............... 219/243 UX |
| 3,166,459 | 1/1965 | Imhof .............................. 219/243 X |

*Primary Examiner*—C. L. Albritton
*Attorney, Agent, or Firm*—Barnes, Kisselle, Raisch & Choate

[57] ABSTRACT

For a device producing heat seals in lapped portions of plastic film a sealing head having a bar with a longitudinally extending free edge for bearing on the plastic film to transfer heat thereto. An electrical resistance heating element extends generally longitudinally of an exterior surface of the bar and a strip of an insulating material overlies the heating element and is wrapped around the bar. The bar, heating element, and strip of insulating material are frictionally received between a pair of carrier plates releasably secured to a mounting bracket.

25 Claims, 4 Drawing Figures

U.S. Patent  Oct. 28, 1975  3,916,148
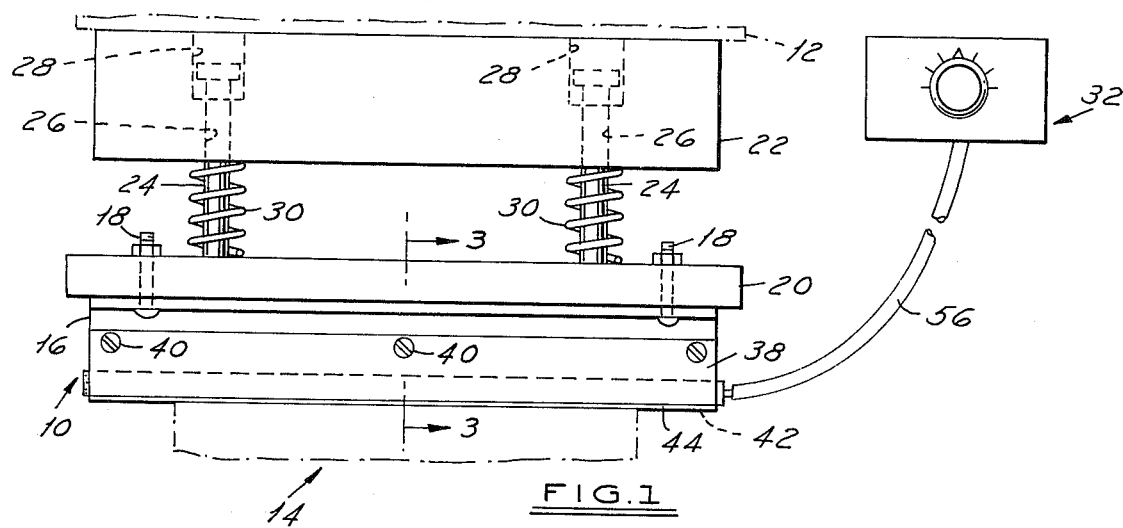
FIG.1
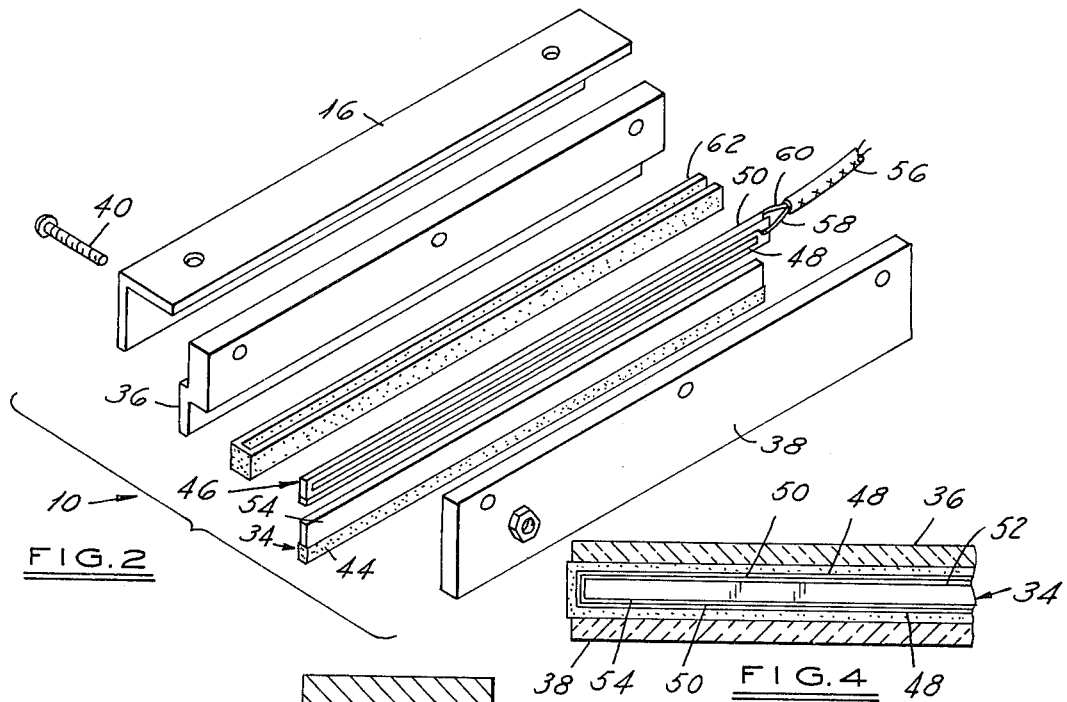
FIG.2
FIG.4
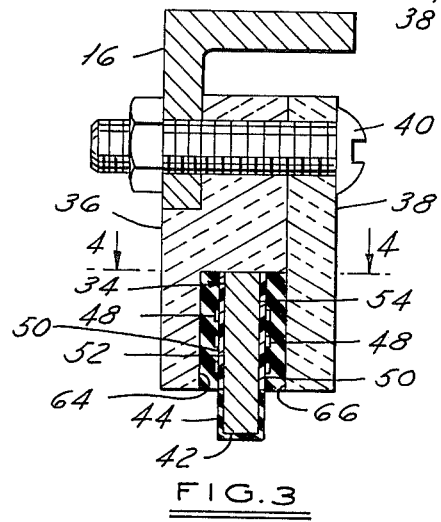
FIG.3

HEAT SEALING HEAD FOR PLASTIC FILMS

This invention relates to devices for sealing together lapped portions of plastic film by the application of heat thereto and more particularly to a heat sealing head.

Heat sealing devices are known for adhering separate lapped portions of plastic film together. Such devices are usually in the form of a sealing head having a protruding edge heated to an elevated temperature which is moved into engagement with lapped portions of plastic film to transfer heat thereto causing the contacted portions thereof to flow together and congeal along a predetermined line to produce a so-called heat seal adhering the portions of plastic film together.

Objects of this invention are to provide an electrically energized heat sealing head for plastic film providing a more uniform distribution of heat throughout the free edge thereof, improved focusing and directing of heat from the head to the plastic film, improved control of the operating temperature thereof, and increased useful life in service, which may be readily serviced and economically manufactured and assembled, and produces an improved heat seal in lapped portions of plastic film.

These and other objects, features and advantages of this invention will be apparent from the following description, appended claims, and accompanying drawing in which:

FIG. 1 is a side view of a heat sealing head embodying this invention mounted on a ram of a press device (indicated in phantom) for producing heat seals in lapped portions of plastic film.

FIG. 2 is an exploded view of the heat sealing head of FIG. 1.

FIG. 3 is a sectional view on line 3—3 of FIG. 1.

FIG. 4 is a fragmentary sectional view on line 4—4 of FIG. 3.

Referring in more detail to the drawing, FIG. 1 illustrates a heat sealing head 10 embodying this invention carried by a ram 12 of a press 14 (shown in phantom). Sealing head 10 has an L-shaped mounting bracket 16 secured by bolts 18 to a platen 20 yieldably carried for limited axial displacement with respect to ram 12 by a mounting plate 22 secured to the ram. Platen 20 is movably carried on mounting plate 22 by a pair of headed guide rods 24, each slidably received in a bore 26 and counterbore 28 in mounting plate 22 and fixed to platen 20. Platen 20 is yieldably urged away from mounting plate 22 by compression springs 30 interposed therebetween and encircling rods 24. A temperature control 32 regulates the supply of electric current to sealing head 10 to control the operating temperature thereof.

As shown in FIGS. 2 through 4, sealing head 10 has a longitudinally extending bar 34 of a material with a high thermal conductivity, such as copper or aluminum. Bar 34 is received between carrier plates 36 and 38 releasably secured to mounting bracket 16 by bolts 40. Bar 34 has a longitudinally extending lower free edge 42 with a coating 44 of Teflon thereon to prevent the free edge 42 from sticking or adhering to a plastic film when the heated edge 42 is contacted therewith. Heat is supplied to bar 34 by a heating element 46 which has a continuous ribbon 48 of an electrical resistance heating material carried on a generally U-shaped loop 50 of a plastic film. Loop 50 is formed of a material, such as Mylar, which does not deteriorate and remains in solid form at the elevated temperatures at which the ribbon operates. For convenience of illustration, continuous ribbon 48 is shown with three longitudinally extending traverses or legs interconnected adjacent their ends on each leg of loop 50, although the ribbon 48 preferably has five interconnected legs on each leg of the loop. Of course, ribbon 48 could have a plurality of generally vertically extending legs arranged in a sawtooth or sinuous pattern instead of longitudinally extending legs. Regardless of the configuration of ribbon 48, it is important that the ribbon overlies the exterior of the bar in heat conducting relation thereto substantially throughout the length of the bar.

In assembly, heater element 46 is wrapped around the exterior of bar 34 so that the legs of ribbon 48 overlie and extend generally longitudinally of opposed exterior side faces 52 and 54 of bar 34 in good heat conducting relation thereto. Current is supplied to continuous ribbon 48 from temperature control 32 through an electric cable 56 with lead wires 58 and 60 electrically connected to the ends of ribbon 48. The plastic film of loop 50 provides an electrical insulator between ribbon 48 and bar 34 although, if desired, side faces 52 and 54 of the bar may be completely coated with Teflon to provide an electrical insulator between the bar and ribbon 48.

A generally U-shaped strip 62 of a thermal insulating material, such as silicone rubber, is wrapped around heater element 46 and interposed between bar 34 and carrier plates 36 and 38. Insulating strip 62 provides thermal shielding or insulation for bar 34 to increase the conduction of the heat produced by heater element 46 through free edge 42 of the bar and into lapped portions of the plastic film on which the free edge of the bar bears in producing a heat seal in the plastic film. Preferably, insulating strip 62 has a thermal conductivity of less than one-tenth of bar 34 and is also an electrical insulator. Insulating strip 62 is an elastic material which is partially compressed between a shoulder 64 of carrier plate 36 and the inner face of carrier plate 38 to frictionally retain bar 34 and heater element 46 in assembled relation within the longitudinal groove or recess formed by the cooperation of shoulder 64 of carrier plate 36 and carrier plate 38.

Preferably, carrier plates 36 and 38 are made of a thermal and electrical insulating material, such as Bakelite, and heater element 46 is a printed circuit with continuous ribbon 48 deposited on the plastic film of loop 50. Preferably, ribbon 48 is not more than about 0.001 of an inch thick and one-sixteenth of an inch wide to provide a ribbon having a high electrical resistance. The plastic film of loop 50 is preferably not more than about 0.010 of an inch thick to minimize the thermal barrier to conduction of heat from ribbon 48 to bar 34. Preferably, free edge 42 of bar 34 is not wider than about one-fourth of the vertical height of the bar and does not project beyond insulator strip 62 more than about one-eighth of an inch. In practice, a heat sealing head embodying this invention with a bar 34 and heater element 46 of the following materials and dimensions has proved to be highly satisfactory: a bar 34 of copper about one-sixteenth of an inch thick and three-eighths of an inch wide, a heater element 46 with a loop 50 of a plastic film of insulating material having a high melting point and an average thickness of about 0.005 of an inch and a nominal width of one-quarter of an inch with five traverses of continuous ribbon 48 on each leg thereof, the ribbon having an average thickness of about 0.0001 of an inch and a width of about one thirty-second of an inch. The exposed edge 42 of bar 34 has a width and height of about one-sixteenth of an inch.

To control the temperature to which bar 34 is heated by heater element 46, ribbon 48 thereof is preferably an electrical resistance heating element formed from an alloy, the resistance of which varies substantially with and is proportional to the temperature thereof within the operating temperature range of the sealing head. The element must have a usable change in resistance with a relatively small change in the temperature thereof within the range of normal operating temperatures of the ribbon and preferably have both a positive temperature coefficient and a substantially lineal change in resistance for each increment of change in temperature throughout the normal operating temperature range of the sealing head. Well known nickel-iron alloys may be used for the ribbon of the heater element and, in practice, a Balco alloy produced by the Driver-Harris Company of Harrison, New Jersey, has proved to be highly satisfactory.

When ribbon 48 of heater element 46 is made of a metal alloy having a positive coefficient of temperature with a usable change in resistance with a relatively small change in the temperature thereof, temperature control 32 may be of the type shown in Evalds U.S. Pat. No. 3,679,871, issued July 25, 1972, filed Jan. 5, 1971 and assigned application Ser. No. 104,075. The temperature control disclosed in this Evalds patent both supplies current to heater element 46 and utilizes the change in resistance of ribbon 48, due to the change in temperature thereof, in a bridge circuit to turn on and off the supply of current to the ribbon, thereby maintaining the ribbon at a preselected operating temperature within very close tolerances. Since such circuitry is fully described in this Evalds U.S. Pat. No. 3,679,871 which is incorporated herein by reference, the construction and operation of such temperature control will not be further described herein.

In use, sealing head 10 is mounted in a heat sealing press 14 as shown in FIG. 1 and temperature control 32 is adjusted to maintain the free edge 42 of bar 34 of the sealing head at the desired operating temperature, which is usually in the range of about 200° to 600°F and often about 400°F. Lapped portions of plastic film are inserted into the throat of press 14 to underlie free edge 42 of sealing head 10 and the press is actuated to extend ram 12 thereof and move the free edge 42 downwardly so that it bears on the lapped portions of plastic film. When free edge 42 of heated bar 34 bears on the lapped portions of plastic film, heat is conducted from bar 34 into such portions to heat such portions to a semi-fluid state. When the ram of press 14 is retracted, free edge 42 of sealing head 10 disengages from the lapped portions of plastic film. Such portions congeal into a single mass, thereby providing a so-called heat seal which adheres the lapped portions of plastic film to each other along a straight or curved line corresponding to the configuration of bar 34. Although bar 34 is illustrated as a straight bar, it will be appreciated that the bar can be formed to produce a seal of any desired configuration.

In sealing heads embodying this invention, wrapping the heating element around the bar so that the heating ribbon extends generally longitudinally of the exterior side faces of the bar closely adjacent thereto provides a uniform distribution of heat throughout the length of the free edge of the bar. Positioning the ribbon of the heater element so that it is spaced from but close to the free edge of the bar and surrounding both the heater element and the bar with an insulating material so that only the free edge thereof is exposed is very desirable. This arrangement provides a sealing head with improved focusing or direction of heat from the sealing head to the plastic film, which results in an improved heat seal and allows the head to be disposed closer to the plastic film by decreasing spurious radiation of heat from the head. Thus, the head can be continuously maintained at an elevated operating temperature and reciprocated at a rapid rate, thereby increasing the rate of production of heat seals in plastic film.

Extending the ribbon of the heating element longitudinally along the exterior of the bar in close proximity thereto also eliminates hot spots in the ribbon so that it remains at a substantially uniform temperature throughout its length and minimizes the temperature differential between the ribbon and the sealing bar. This, in turn, improves temperature control of the head by decreasing the thermal lag time between the heating element and the bar, increases the service life of the ribbon of the heating element, and, if the change in the resistance of the ribbon in response to the change in temperature thereof is used to control the temperature of the sealing head, also further improves temperature control of the head. When the change in resistance of the ribbon is used to control the temperature of the sealing head, the elimination of hot spots in the ribbon provides a uniform value of the resistance of each increment of the ribbon throughout its length and, hence, improved temperature control. This is particularly true when the temperature controller is of the type disclosed in U.S. Pat. No. 3,679,871 because the bridge circuitry thereof is very responsive to the resistance of the hottest increment of the ribbon. If increments of the ribbon are at different temperatures, the bridge circuitry views the ribbon as a plurality of resistors of different values connected in series, and hence, the accuracy of the controller is substantially decreased by any hot spots in the ribbon because they substantially influence the overall resistance thereof. Therefore, when the change in resistance of the ribbon is utilized to control the temperature thereof, it is important that the entire ribbon is in uniformly good heat conducting relation with the bar throughout the entire length of the ribbon and the bar so that temperature differentials in the ribbon and bar are minimized.

I claim:

1. A heat sealing head comprising a bar having high thermal conductivity, said bar having a free edge for conducting heat to lapped portions of plastic film to form a heat seal therein, an electrical resistance heating element for supplying heat to said bar, said heating element extending generally longitudinally of said bar exteriorly thereof in heat conducting relation with an exterior surface thereof, said heating element being spaced from said free edge of said bar such that said heating element does not contact any portion of said plastic film as said free edge is conducting heat to lapped portions of plastic film, heat insulating means overlying that side of the heating element opposite said exterior surface of the bar, whereby heat produced by said heating element is conducted primarily into and through said bar to said free edge thereof.

2. The heat sealing head of claim 1 wherein said heating element has multiple interconnected legs overlying the exterior surface of the bar throughout substantially the entire length thereof such that the length of said heating element is a multiple of the length of said exterior surface of the bar.

3. The heat sealing head of claim 1 wherein said electrical resistance heating element comprises an alloy, the electrical resistance of which varies with and is proportional to the temperature thereof such that said element will function to both supply heat to said bar and to indicate a change in the temperature of said bar by a change in the electrical resistance of said element.

4. The heat sealing head of claim 3 wherein said element has a positive coefficient of temperature.

5. The heat sealing head of claim 1 wherein said heat insulating means extends closely adjacent but spaced from said free edge of the bar, whereby heat radiated to the atmosphere by said bar is radiated predominantly by said free edge of said bar.

6. The heat sealing head of claim 5 wherein said electrical resistance heating element comprises an alloy, the electrical resistance of which varies with and is proportional to the temperature thereof such that said element will function to both supply heat to said bar and to indicate a change in the temperature of said bar by a change in the electrical resistance of said element.

7. The heat sealing head of claim 1 which also comprises a carrier having a generally longitudinally extending cavity receiving said bar therein and said heat insulating means includes an elastic material received in said cavity between said bar and said carrier to frictionally retain said bar in said cavity.

8. The heat sealing head of claim 7 wherein said carrier comprises a pair of separate plates forming generally opposed longitudinally extending side walls of said cavity, said plates being dimensioned with respect to each other, said elastic material and said bar such that when said plates are secured in assembly they compress said elastic material to firmly frictionally retain said bar in said cavity.

9. The heat sealing head of claim 7 wherein said elastic material has a coefficient of thermal conductivity which is less than one-tenth of the coefficient of thermal conductivity of said bar such that heat radiated to the atmosphere by said bar is radiated predominantly by said free edge of said bar.

10. The heat sealing head of claim 1 which also comprises a film of a plastic material carrying said element thereon, said film lying adjacent said exterior surface of said bar and extending generally longitudinally thereof.

11. The heat sealing head of claim 10 wherein said electrical resistance heating element comprises an alloy, the electrical resistance of which varies with and is proportional to the temperature thereof such that said element will function to both supply heat to said bar and to indicate a change in the temperature of said bar by a change in the electrical resistance of said element.

12. The heat sealing head of claim 10 wherein said electrical resistance heating element comprises a flat ribbon carried by said film and said flat ribbon has an average thickness which does not exceed one thousandth of an inch.

13. The heat sealing head of claim 12 wherein said flat ribbon carried by said film has an average width which does not exceed one-sixteenth of an inch.

14. The heat sealing head of claim 1 wherein said bar has first and second generally opposed generally longitudinally extending exterior surfaces thereon and said electrical resistance heating element has a plurality of traverses lying closely adjacent to each one of said first and second exterior surfaces in heat conducting relation with said bar, each traverse of said ribbon extending generally longitudinally of said bar exteriorly thereof and being spaced from said free edge of said bar.

15. The heat sealing head of claim 14 wherein said electrical resistance heating element comprises an alloy, the electrical resistance of which varies with and is proportional to the temperature thereof such that said element will function to both supply heat to said bar and to indicate a change in the temperature of said bar by a change in the electrical resistance of said element.

16. The heat sealing head of claim 15 wherein said element has a positive coefficient of temperature.

17. The heat sealing head of claim 14 wherein said heat insulating means extends closely adjacent but spaced from said free edge of said bar, whereby heat radiated to the atmosphere by said bar is radiated predominantly by said free edge of said bar.

18. The heat sealing head of claim 17 which also comprises a film of a plastic material carrying thereon said electrical resistance heating element, said film being interposed between said bar and said heat insulating means, said film extending at least generally longitudinally of said bar and lying closely adjacent said generally opposed exterior surfaces of said bar.

19. The heat sealing head of claim 18 wherein said electrical resistance heating element comprises a printed circuit on said plastic film having an average thickness which does not exceed one thousandth of an inch.

20. The heat sealing head of claim 19 wherein said printed circuit has an average width not exceeding one-sixteenth of an inch.

21. The heat sealing head of claim 1 wherein said heat insulating means extends to within at least one-eighth of an inch of said free edge of said bar.

22. The heat sealing head of claim 1 wherein said free edge of said bar in transverse cross section has a width not greater than one-fourth of the dimension of the bar in cross section in a direction perpendicular to said width of said free edge thereof.

23. The heat sealing head of claim 1 wherein said bar in transverse cross section has a width not greater than one-fourth of the dimension of the bar in cross section in a direction perpendicular to said width of said bar.

24. The heat sealing head of claim 1 wherein said bar has opposed exterior side faces spaced apart a distance not more than one-fourth of the height of said side faces in a direction transverse to the length of said side faces and said heating element overlies said opposed exterior side faces in heat conducting relation with said bar.

25. The heat sealing head of claim 5 wherein said electrical resistance heating element is closely adjacent but spaced from said free edge of said bar.

* * * * *